June 10, 1969 P. A. DUFFY, JR 3,449,574
SEMICONDUCTOR CURRENT PULSE CONTROLLER FOR REGULATING THE EXPOSURE PROVIDED BY AN X-RAY TUBE
Filed Nov. 12, 1965
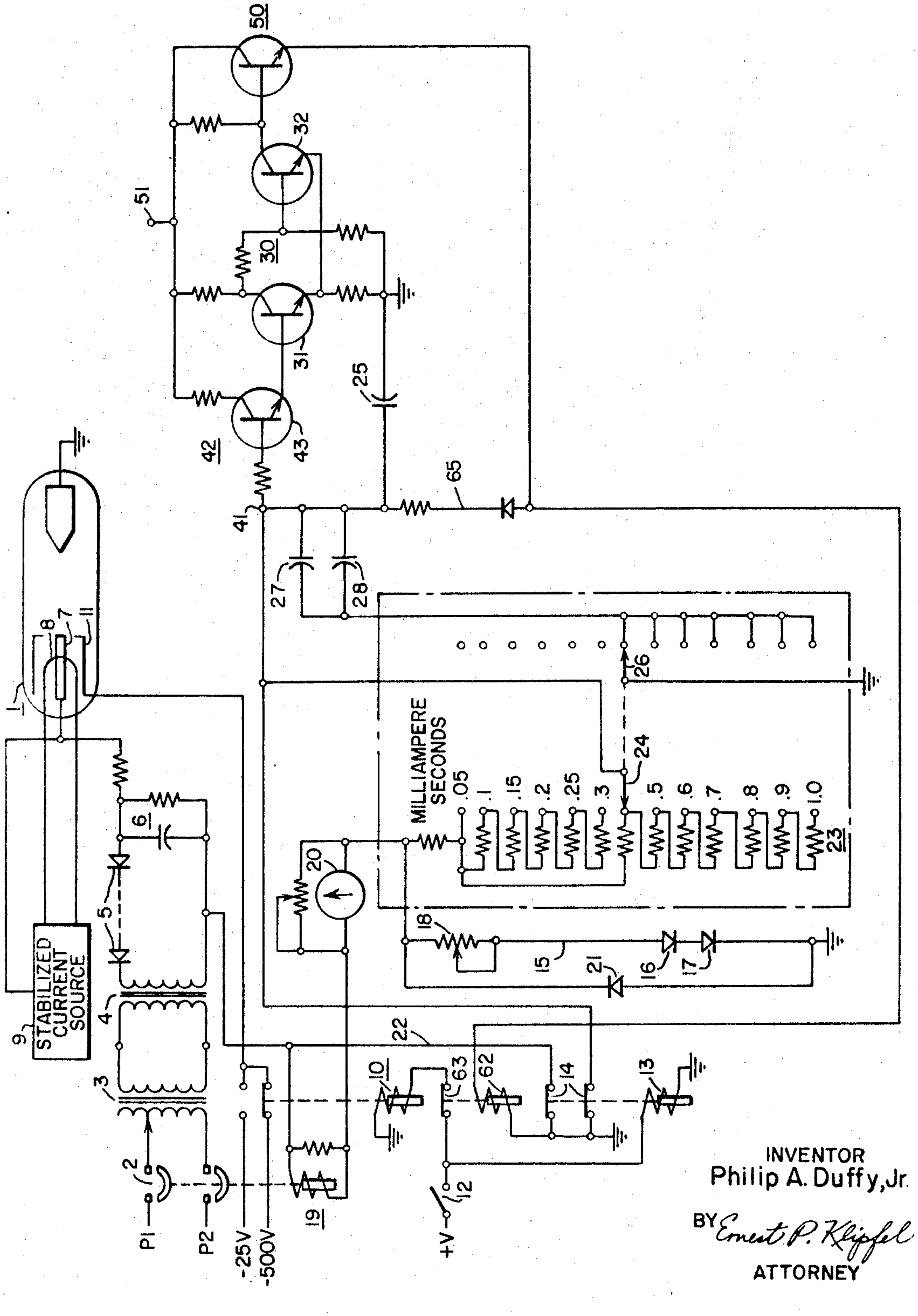
INVENTOR
Philip A. Duffy, Jr.
BY Ernest P. Klipfel
ATTORNEY

United States Patent Office 3,449,574
Patented June 10, 1969

3,449,574

SEMICONDUCTOR CURRENT PULSE CONTROLLER FOR REGULATING THE EXPOSURE PROVIDED BY AN X-RAY TUBE

Philip A. Duffy, Jr., Catonsville, Md., assignor to Westinghouse Electric Corporation, Pittsburgh, Pa., a corporation of Pennsylvania Filed Nov. 12, 1965, Ser. No. 507,490
Int. Cl. H05g *1/46;* H03k *17/28*
U.S. Cl. 250—95 4 Claims

ABSTRACT OF THE DISCLOSURE

A fast acting controller for sensing the magnitude and time duration of current through an X-ray tube wherein a transistorized monostable triggering circuit responds to the attainment of a signal governed by the current magnitude and the prior setting of a desired milliamp-second product by the operator of the X-ray machine. A Darlington type circuit provides an impedance sufficiently high to match the triggering circuit to a charging circuit which determines the milliamp-second product. The triggering circuit provides quick action in interruptng the current through the tube when the desired duration of exposure with a chosen magnitude of current has occurred. A feedback circuit provides an input signal to maintain the monostable triggering circuit in its unstable state until the charging circuit is discharged.

The present invention relates generally to circuitry for controlling a wide range of currents over a variable time span and more particularly relates to semiconductor circuitry for maintaining precise milliampere-second control of an X-ray tube to obtain exact exposures.

It is desirable to obtain a precise control of the exposure provided by an X-ray tube. Such exposure is determined by the elapsed time of current through the tube and the magnitude of such current. For example, the time duration of current may be rather short for a large magnitude of current through the tube while a rather long time duration may dictate a relatively small magnitude of current through the tube. In any event, it is desirable that the elapsed milliamp-second integral be uniformly maintained for current ratings which may vary from .30 milliampere to 1.0 milliampere. The current through the X-ray tube is preset and controlled as precisely as feasible within the cost structure applying to the design. In spite of the use of regulating components, the current can change within limits. In an absolute system some means would be required whereby an operator could correct a filament setting, hence tube current. With the milliamp-second system the exposure time is varied to maintain a relatively constant ma.-seconds product in spite of the current variation. Such uniformity is necessary in the diagnostic application of X-ray apparatus in order to obtain properly exposed X-ray films.

Accordingly, an object of the present invention is to provide circuitry for controlling a wide range of currents over a variable time span in an extremely precise manner.

Another object of the present invention is to provide a current-time integrator with quick action response.

Another object of the present invention is to provide a semiconductor current sensor capable of quick and sure response even to the lowest magnitude of current through an X-ray tube.

Briefly, the present invention provides a fast acting controller for sensing the magnitude and time duration of current through an X-ray tube. A transistorized monostable triggering circuit responds to the attainment of a signal governed by the current magnitude and the prior setting of a desired milliamp-second product by the operator of the X-ray machine. A circuit provides an impedance sufficiently high to match the triggering circuit to a charging circuit which determines the milliamp-second product. The trigger circuit provides quick action in interrupting the current through the tube when the desired duration of exposure with a chosen magnitude of current has occurred.

Further objects and advantages of the present invention will be readily apparent from the following detailed description taken in conjunction with the drawing in which the sole figure is an electrical schematic diagram of an illustrative embodiment of the present invention.

Energization of the X-ray tube 1 to its ready position is established by closing a representative power switch 2. The power leads P1 and P2 energize the variable tap power transformer 3 which can be adjusted to control the voltage applied to X-ray tube 1. The power of the secondary winding of the transformer 3 is transformed at 4 to a voltage suitable for the tube 1. Rectifiers 5 and an RC filter 6 provide a steady-state direct current voltage to the tube 1. Current through the X-ray tube is determined by the temperature of the cathode 7 which in turn is determined by the temperature of the filament 8 and regulated by a stabilized current source 9 such as a magnetic amplifier feedback regulator. The X-ray tube 1 however is biased to its non-conducting state by means of the contactor 10 which has a normally closed position connecting a biasing voltage, —500 volts, to the grid 11 thereby shielding the cathode 7 from conduction.

A switch 12 is closed to energize the operating coil of the contactor 10 to connect the shield 11 to a potential, indicated at —25 volts, for allowing current flow. At the same time operating coil 13 is energized to actuate switch 14 to its open-position for purposes to be more fully explained hereinafter. The magnitude of current through a tube 1 is precisely controlled in a manner unrelated to the present invention. The control of the magnitude of tube current is schematically illustrated at 9.

Upon the start of current through the X-ray tube, the magnitude of the current is sensed across the series circuit combination 15 of voltage dropping diodes 16, 17 and dropping resistor 18. The series circuit combination may be connected to sense current through the X-ray tube 1 through an overload relay 19 for protection and a meter 20 for visual readout. The diode 21 bypasses an alternating current induced in the sensing circuit by spurious signals acting upon the long lead line 22 conected to sense the current.

The voltage drop across the series circuit combination of dropping the resistor 18 and diodes 16, 17 also appears across a selected combination of resistance elements 23 connected to be inserted in series by selector switch 24 with the charging capacitor 25. The various combinations of resistance elements are chosen by the selector switch 24 to insert different values of resistance in series with the capacitor 25 thereby determining the rate at which the capacitor 25 will store energy. Each combination that can be selected is identified by a milliamp-second designation extending from 0.05 to 1.0. For the longer time durations, the selector switch 26 is engaged for connecting additional capacitors 27 and 28 to be charged by the circuit 15 sensing current through the X-ray tube 1.

A monostable triggering circuit 30 provides quick trigger action upon the capacitor 25 having a charge exceeding a predetermined magnitude. Transistors 31 and 32 are operated in a switching mode and are connected by associated resistors to provide a Schmitt trigger. Upon application of a proper input signal to the circuit 30 the Schmitt trigger will switch to an unstable state where it will remain until the input signal to the circuit 30 falls below the magnitude of input signal necessary to maintain the circuit in its unstable state. The circuit 30 would normally return to its original stable state after a length of time determined by the circuit constants.

For illustration, the proper input signal to trigger the Schmitt trigger as determined by its associated components is designated as any voltage exceeding 1.7 volts. For a quick acting controller, the series diodes 16, 17 are chosen to have a fixed forward voltage drop providing a fixed voltage of say 1.4 volts in series with the dropping resistor 18 thereby reducing the dead zone gap to .3 volt and a corresponding current of 0.25 milliamp. Hence, a value of voltage across the series circuit combination greater than 1.7 volts will trigger the Schmitt trigger 30 in accordance with the time established by the integral selector switch 24. The resistance elements 23 serially connected with the capacitor 25 provide an RC integrator having an integral signal established by the charge on the capacitor which will build up at a rate determined by the resistive elements inserted in series with the capacitor 25.

Upon the charge on the capacitor 25, or capacitors 25, 27 and 28 if they are selected to be in the circuit, building up an equivalent input signal will appear at the input terminal 41 of an input stage 42 connecting the capacitor 25 to the switching transistor 31. The input circuit 42 comprises a transistor amplifier stage 43 connected to the switching transistor 31 in a compound circuit configuration providing an emitter current ratio which is equal to the product of the individual emitter factors $\beta$43 and $\beta$31 of the transistors 43 and 31. The resultant circuit combination provides a high input impedance to match that of the RC integral selector.

The stable output state of the Schmitt trigger is such that the switching transistor 32 is normally conducting while the switching transistor 31 is normally in its nonconducting state or open. In response to an input signal exceeding the threshold level of the trigger 30, the transistor 31 is rendered conductive thereby rendering the transistor 32 nonconductive. The switching action of transistor 32 to its nonconducting state raises the potential on the control electrode of an amplifying transistor 50 to render that transistor conductive. A DC power supply connected at 51 is then connected to energize the operating coil 62 of a contactor which opens the contactor indicated at 63. Upon actuation of the contactor 63, the energization of the holding coil of the contactor 10 is interrupted and the contactor returns to its normally closed position thereby reinserting the large biasing potential on the grid 11 which interrupts the current flow through the X-ray tube 1.

In order to maintain the Schmitt trigger 30 in its unstable state, a feedback circuit 65 provides a signal from the amplifier circuit 50 to the input terminal 41 which input signal will remain until the input terminal 41 and hence the capacitor 25 is discharged to ground.

To reset the integrating means by discharging the capacitor 25, the switch 12 is reopened thereby deenergizing the holding coil 13 and allowing its contactor 14 to return to its normally closed positions connecting capacitor 25 to ground as well as grounding the sensing lead 22.

While the present invention has been described with a degree of particularity for the purposes of illustration, it is to be understood that all modifications, substitutions and alterations within the spirit and scope of the invention are herein meant to be included.

I claim as my invention:

1. Circuitry for controlling the exposure provided by an X-ray tube comprising, in combination; means for sensing the magnitude of current through said X-ray tube; energy storage means for charging in response to said magnitude of current and its time duration; means for controlling the rate at which said energy storage means will charge; first and second semiconductor switching means connected in a monostable triggering combination providing an output when the charge across said energy storage means exceeds a predetermined level; feedback means for holding said monostable triggering combination in its output providing condition until released by discharge of said energy storage means; first semiconductor amplifying means connected between said energy storage means and said first semiconductor switching means in a compound connected amplifier combination with said first semiconductor switching means; and means responsive to the output of said monostable triggering combination for interrupting current through said X-ray tube.

2. Circuitry for controlling the exposure provided by an X-ray tube comprising, in combination; means for sensing the magnitude of current through said X-ray tube; energy storage means for charging in response to said magnitude of current and its time duration; means for controlling the rate at which said energy storage means will charge including a plurality of resistance elements and means for selecting combinations of said plurality of resistance elements between said means for sensing and said energy storage means; first and second semiconductor switching means connected in a monostable triggering combination providing an output when the charge across said energy storage means exceeds a predetermined level; first semiconductor amplifying means connected between said energy storage means and said first semiconductor switching means in a compound connected amplifier combination with said first semiconductor switching means; said means for sensing including voltage dropping means for measuring the magnitude of current through said X-ray tube and means inserting a fixed voltage drop in series circuit combination with said voltage dropping means; said series circuit combination connected in parallel circuit combination with the selected combination of resistance elements connected to said energy storage means; and means responsive to the output of said monostable triggering combination for interruptitng current through said X-ray tube.

3. Circuitry for controlling a wide range of currents over a variable time span comprising, in combination; means for integrating the magnitude of current to be controlled and the elapsed time of such current flow; monostable triggering means responsive to the integral signal from said integrating means exceeding a predetermined level for switching to an unstable output state; an input stage matching the impedance of said integrating means for connecting the integral signal to said monostable triggering means; and amplifier means responsive to said unstable output state for interrupting the current being controlled.

4. A circuitry of claim 3 including feedback means connecting said amplifier means to said input stage for holding said monostable triggering means in its unstable output state until released by resetting of said integrator means.

References Cited

UNITED STATES PATENTS

| | | | |
|---|---|---|---|
| 2,663,806 | 12/1953 | Darlington | 307—303 |
| 3,192,449 | 6/1965 | Brockett | 307—315 X |
| 3,287,608 | 11/1966 | Pokrant | 317—142 |
| 2,883,554 | 4/1959 | Reed et al. | 250—95 |
| 3,284,631 | 11/1966 | Splain | 250—95 |

RALPH G. NILSON, *Primary Examiner.*

A. L. BIRCH, *Assistant Examiner.*

U.S. Cl. X.R.

307—247; 317—148.5